United States Patent [19]

McCloskey

[11] 4,059,317
[45] Nov. 22, 1977

[54] SPHERICAL BEARING WITH SLOTTED KEY

[75] Inventor: Albert R. McCloskey, Fairfield, Conn.

[73] Assignee: The Heim Universal Corporation, Fairfield, Conn.

[21] Appl. No.: 632,560

[22] Filed: Nov. 17, 1975

Related U.S. Application Data

[63] Continuation of Ser. No. 531,899, Dec. 12, 1974, abandoned.

[51] Int. Cl.$^2$ .............................................. F16C 23/00
[52] U.S. Cl. ........................................ 308/72; 308/196
[58] Field of Search ........... 308/72, 29, 184 R, 189 A, 308/193–197; 403/132, 136, 137

[56] References Cited

U.S. PATENT DOCUMENTS

| 3,365,249 | 1/1968 | McCloskey | 308/72 |
| 3,506,315 | 4/1970 | Young, Jr. | 308/72 |

FOREIGN PATENT DOCUMENTS

| 1,351,760 | 12/1963 | France | 308/189 A |
| 779,191 | 1/1957 | United Kingdom | 308/72 |

Primary Examiner—Richard A. Bertsch
Attorney, Agent, or Firm—James C. Wray

[57] ABSTRACT

A spherical bearing includes an outer member having a hole extending from side to side, the surface of the hole being concave and spherical so that the outer member has constricted portions at each side. The outer member also has a walled keyway extending downward from the hole and extending axially from side to side of the outer member substantially perpendicular to the sides of the outer member; a walled key in the keyway is co-extensive with the keyway. The key also has a concave and spherical top surface corresponding to the surface of the hole so that the key has shoulder portions corresponding to the constricted portions of the outer member. A partially spherical inner member has flat sides, the inner member being held in the outer member by impingement of the spherical surface of the inner member against the constricted portions of the outer member and the key being held in the outer member by impingement of the shoulder portions of the key against the spherical surface of the inner member. A radial slot extends through the walled key. A resilient member disposed in the slot and abut the inner surface of each of the walls, with an adjusting member in the wall of the key to vary the width of the slot thereby varying the bearing tolerance between the inner and outer member and varying the degree of compression of the resilient member and therefore the degree of the preloading force exerted by the key member on the spherical surface of the inner member.

8 Claims, 9 Drawing Figures

SPHERICAL BEARING WITH SLOTTED KEY

This is a continuation, of application Ser. No. 531,899, filed Dec. 12, 1974 now abandoned.

BACKGROUND OF THE INVENTION

The present invention relates generally to self-aligning bearings having a ball-like inner member with a convex outer surface and an outer member having an inner surface with a complimentary concave spherical inner face. These types of bearings, which are commonly called "spherical bearings," have been utilized in industry for a substantial period of time. The technological evolution of these type bearings has been directed more in the terms of material composition of its various component parts rather than toward basic changes in design concepts. Accordingly, the design advances in spherical bearings have not been substantial in nature and thereby presently limiting their applications.

One area in which the spherical bearings have been extensively applied is the aircraft industry. This is due to the spherical bearing self-aligning characteristic. A typical such application is marrying of a spherical bearing to a landing gear strut or member of an airplane. In this application the outer race is commonly press-fitted into a housing or the like rendering it difficult to remove and/or maintain. When any such maintenance is required, such as replacing of the ball, the entire bearing assembly including the inner and outer race member would have to be removed and replaced by an entirely new bearing assembly. Such an operation could entail substantial expense and down time of the entire aircraft.

There are a number of prior art type spherical bearings which have been addressed to this kind of problem. One such type prior art bearing is the "messerschmidt" bearing. A concept of this bearing is that the ball can be removed in the field without disassembling the entire bearing, that is, removing the outer race member from its mounting.

One may refer to my prior invention in this general field as embodied in U.S. Pat. No. 3,365,249, patented Jan. 23, 1968 entitled "Spherical Bearing." This particular bearing may be disassembled in the field but may not be "adjusted" without the provision of new component parts. Such an adjustment may include the varying of the bearing tolerance between the two race (i.e., inner and outer) members which may change during operational usage. One may also refer to my more recent invention also in this field as embodied in U.S. patent application Ser. 530,697 filed Dec. 9, 1974, and entitled "Spherical Bearing With Slotted Key;" now U.S. Pat. No. 3,934,954. This invention contemplates a partial slot in the key which may be used to vary the bearing tolerances.

SUMMARY OF THE INVENTION

It is therefore, a primary object of the present invention to provide a spherical bearing comprising an outer member having a hole extending from side to side, the surface of the hole being concave and spherical so that the outer member has constricted portions at each side, the outer member also having a walled keyway extending downward from the hole and extending axially from side to side of the outer member substantially perpendicular to the sides of the outer member; a walled key in the keyway co-extensive with the keyway, the key also having a concave and spherical top surface corresponding to the surface of the hole so that the key has shoulder portions corresponding to the constricted portions of the outer member; and a partially spherical inner member having flat sides, the inner member being held in the outer member by impingement of the spherical surface of the inner member against the constricted portions of the outer member and the key being held in the outer member by impingement of the shoulder portions of the key against the spherical surface of the inner member, the improvement comprising the provision of a radial slot extending through the walled key, a resilient member disposed in said slot and abutting the inner surface of each of the walls, adjusting means in the wall of the key to vary the width of the slot thereby varying the bearing tolerances between the inner and outer member and varying the degree of compression of said plastic member and therefore the degree of the preloading force exerted by the resilient member on the spherical surface of the inner member.

It is another object of the present invention to provide a spherical bearing wherein said adjusting means includes an adjusting screw threaded into one of the two walls defined by said slot, the head of said screw shouldered in the other of said walls.

It is still another object of the present invention to provide a spherical bearing wherein said radially extending slot is through said key in a radial direction, a resilient member being disposed in said slot, said plastic member being a sheet of resilient plastic material.

It is a further object of the present invention to provide a spherical bearing wherein said radially extending slot is only partially through said key in a radial direction, a plastic member being disposed in said slot, said resilient member being at least one O ring of resilient plastic material.

It is yet another object of the present invention to provide a spherical bearing wherein there is one "O" centrally disposed about the adjusting means, the adjusting means being a screw threaded into one of the walls.

It is still another object of the present invention to provide a spherical bearing wherein there are annular grooves in the walls to accommodate the O rings.

Embodiments of the bearing according to the concept of the present invention are shown and/or described by way of example in the accompanying drawings and following description of the invention without attempting to show or describe all of the various forms and modifications in which the invention might be embodied; the invention being measured by the appended claims and not by the details of the specification.

BRIEF DESCRIPTION OF THE DRAWINGS

FIG. 3 is a sectional view of the spherical bearing of FIG. 4 taken along line 3—3;

DESCRIPTION OF THE INVENTION

A spherical bearing embodying the concept of the present invention is generally indicated, as appropriate, by numeral 10 on the attached drawing as set forth in FIGS. 1 through 4, inclusive.

The bearing 10 shown is of the rod end spherical bearing variety, however, the present invention is also applicable to spherical bearings as well.

Figure 1:
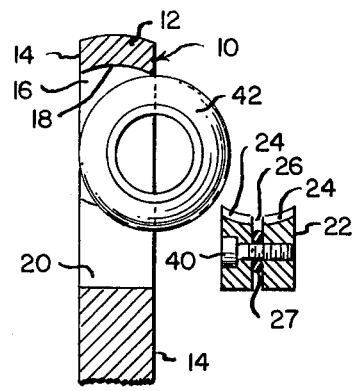
FIG. 1 is a partial section view of a spherical bearing assembly in accordance with the present invention in a disassembled state showing the outer member in section with the slotted key in section removed with the inner member being inserted into the outer member.
Figure 2:
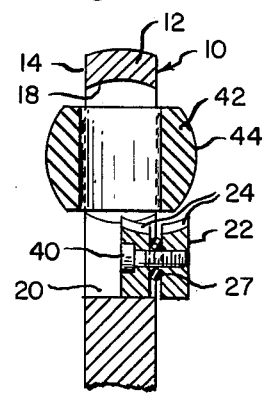
FIG. 2 is the spherical bearing assembly of FIG. 1 showing the outer member and the inner member in section after the inner member has been inserted and rotated to make room for the insertion of the slotted key and it also shows the slotted key in the process of being inserted.
Figure 3:
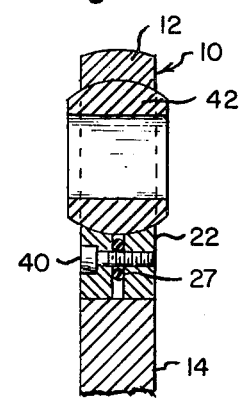
FIG. 3 is the spherical bearing of FIG. 1 in section and in its assembled state showing all parts in their final position.
Figure 4:
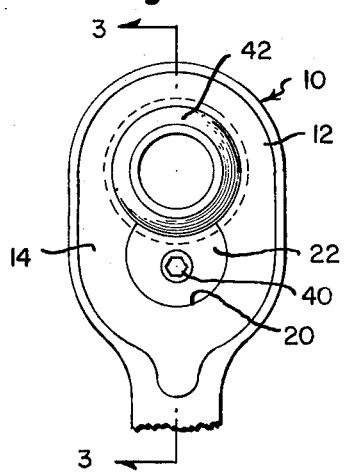
FIG. 4 is a side elevational view of the assembled spherical bearing of FIG. 3, that is

FIGS. 1 through 4 show the bearing 10 in various stages of assembly. In particular FIG. 4 shows an outer member 12 with substantially flat sides 14. The outer member 12 is also provided with a hole or bore 16 formed therethrough as by machining or drilling or the like.

The hole or bore 16 is further formed to provide a concave inner surface 18 which serves as the outer race. There is also formed in the outer member 12 a keyway 20 which may be shaped in various ways. For example it can be rounded as shown in FIG. 4 to accomodate for registration therein a rounded key 22. The keyway may be shaped in a dovetailed fashion as well as to accomodate for registration therein a dovetailed shaped key (not shown).

The rounded keyway 20 extends entirely through the outer member 12 in an axial direction. It can be seen that the rounded key 22 has formed on a part of its surface not embraced by the keyway 20 a concave surface 24 which is continuous with the concave inner surface 18 formed on the inner surface of the bore 16 of the outer member 12.

It should be noted that the concave surfaces (18 and 24) of both the outer member 12 and the key 22 respectively can be formed in one machine operation with the key 22 in place in the keyway 20.

Figure 5:
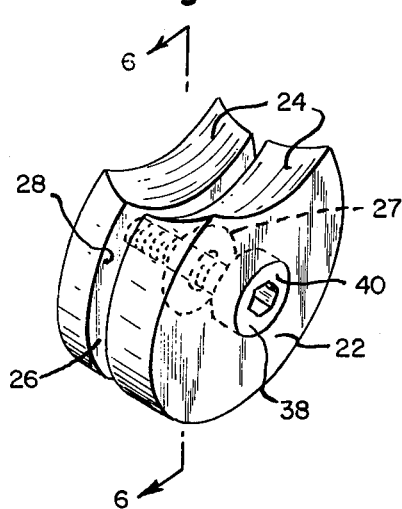
FIG. 5 is an enlarged isometric view of the slotted key as used in FIGS. 1 through 4.
Figure 6:
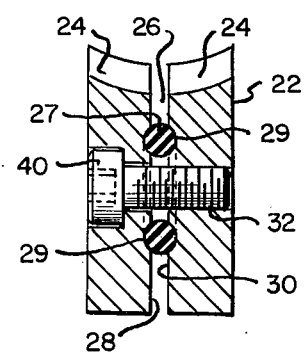
FIG. 6 is a transverse sectional view of the key of FIG. 5 taken along line 5—5.

The major point of novelty is to be found in the particular configuration of the key 22 and in particular to the provision of a resilient member 27 disposed in the slot 26 in the key 22. As can be seen from FIGS. 1 through 5 and in particular FIG. 5, the resilient member 27 may be at least one 0-ring 27. To maintain the position of the 0-ring 27, the O-ring may be disposed in two matching annular grooves 29 formed in the faces of a first wall 28 and a second wall 30 which are defined by the slot 26. The slot 26 extends entirely through the key 22 in a radial fashion. The second wall 30 is provided with a threaded portion 32 which is in registration with a bore 34 and shoulder 36 both provided in the first wall 28.

The key is further provided with a threaded adjusting screw 38 whose threads are threaded into the threads 32 and whose head 40 is shouldered on the shoulder 36. The slotted key 22 may be "adjusted" in a manner to be later described.

The spherical bearing is also provided with an inner member 42 which is similar to those found in prior art forms of spherical bearings. The inner member 42 is provided with a convex outer surface 44 which is complimentary to the concave inner surfaces 18 and 24 of the outer member and the key 22 respectively.

As before mentioned there is provided in the slot 26 a single O-ring 27 disposed in matching annular grooves 29. The number, size and resiliency of the O-ring will be determined by the degree of controlled pre-loading that is desired to be effected. For example, there could be disposed within the slot 26 two concentrically fitting 0-rings; the inner of the two having an inside diameter approximating the outside diameter of the screw 38.

To assemble the bearing 10, the inner member 42 is inserted within the bore 16 of the outer member without the key 22, that is, the inner member 42 is partially accomodated by the keyway 20. This step can best be seen in FIG. 1. Referring now to FIG. 2 the inner member 42 is rotated to permit the insertion of the key 22. Final insertion of the key 22 within the keyway can be seen in FIG. 3 which further shows the inner member 42 rotated back to its operational position. In this way the member 42 is held operationally within the outer member because its convex spherical surface 44 impinges against the constricted portions of the bore 16 as defined by the termini of the concave inner surfaces 18 and 24 of the outer member 12 and key 22 respectively.

It should be noted that the bearing 10 can be assembled in an alternative fashion as follows; the key 22 which is essentially segmented can be assembled after insertion of the inner member 42. That is the inner member could be placed in its operational position within the bore 16 and thereupon the key including the two outer portions and the resilient members 27 in place could be assembled and fixed in position by the insertion and threading of the screw 38 into the threads 32 of the key.

At this point the spherical bearing 10 of FIGS. 3 and 4 is operationally assembled. It is at this point that the above-noted point of novelty can be best understood that is, the provision of the resilient member 27 disposed in the slot 26 in the key 22. As before mentioned the key 22 is provided with an adjusting screw 38 which can vary the width of the slot. It can be seen that if the adjusting screw is further threaded into the threads 32 the two walls 28 and 30 will be drawn toward each other which will tend to reduce the bearing tolerance between the concave 24 of the key and convex outer surface 44 of the inner member. Counteracting this reducing force is the resilient action of the resilient member 27. That is, as the adjusting screw is further threaded into the threads 32 and the width of the slot is decreased, the resilient member 27 will be further and further compressed. In this way a predetermined pre-loading force can be generated which is directed to the outer surface of the inner member 42. Accordingly wear experience in the bearing components (i.e., the inner member 42 and the outer member 12) can be compensated for by the interaction between the slotted key 22 and the inner and outer members 42 and 12. Further and as before mentioned, a preselected pre-loading force can be generated by adjustment of the adjusting screw 38. It should be noted that the provision of the resilient member 27 will enable the bearing 10 to accommodate "operational shock" loading without causing irreparable damage to the bearing 10.

These important features are a substantial advance over the prior art in that it facilitates "in the field"

adjustments of the bearing parts while they are in place and reduces wear of bearing component parts.

The O-ring 27 may be manufactured from a wide range of suitable materials depending on the degree of resiliency desired and environment in which the bearing 10 will be operationally disposed. Typically, the O-ring could be manufactured from a suitable non-metallic material such as silicone rubber, neoprene, rubber cork, plastic, fiber compositions and the like.

Figure 7:
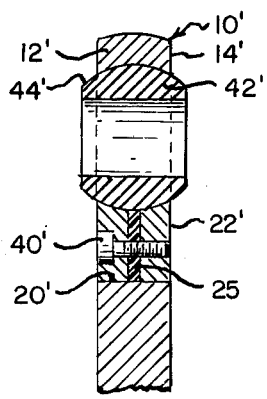
FIG. 7 is a sectional view of another form of the present invention in which the slotted key is provided with another form of resilient material.
Figure 8:
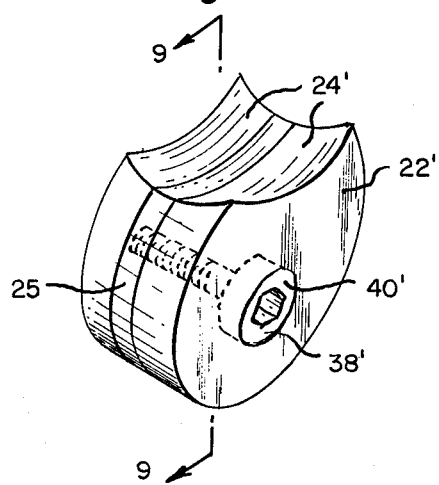
FIG. 8 is an enlarged isometric view of the slotted key as used in FIG. 6.
Figure 9:
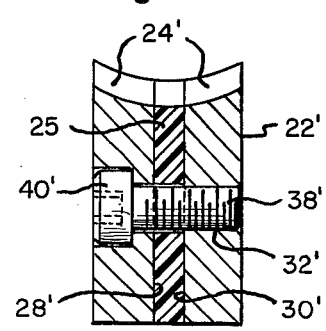
FIG. 9 is a transverse sectional view of the key of FIG. 8 taken along line 9—9.

The bearing of FIG. 7 and its key as shown in FIG. 8 has been denoted by the same numbers as those used in describing the bearing of FIGS. 1 through 5 (except as noted) however each number has had a "prime" affixed to it. The above description of the bearing 10 is also applicable to the bearing 10' except for the form of the resilient member 25 disposed in the radially extending slot 26. As can be seen from FIGS. 7 through 9, the resilient member 25 comprises a sheet material which could be manufactured from one or more of the above noted materials. In most instances, the resilient member 25, in sheet form, will be manufactured from the same material (i.e., it will be homogenous throughout) and will provide a more firmer "float" for the inner member 42. Of course, there may be certain situations in which it may be desirous to manufacture the sheet resilient member 25 from a laminate structure to effect certain desired pre-loading properties.

From the above description of the invention along with various figures as set forth in the drawings it will be readily seen and appreciated that a spherical bearing embodying the concept of the present invention will positively and effectively accomplish the objectives of the invention. The above-noted embodiment is shown by way of example without attempting to show all the various forms and modifications in which the invention might be embodied; the invention being measured by the appended claims and not the specific details of the specification.

I claim:

1. A spherical bearing comprising an outer member having a hole extending from side to side, the surface of the hole being concave and spherical so that the outer member has constricted portions at each side, the outer member also having a walled keyway extending downward from the hole and extending axially from side to side of the outer member substantially perpendicular to the sides of the outer member; a walled key in the keyway co-extensive with the keyway, the key also having a concave and spherical top surface corresponding to the surface of the hole so that the key has shoulder portions corresponding to the constricted portions of the outer member; and a partially spherical inner member havng flat sides, the inner member being held in the outer member by impingement of the spherical surface of the inner member against the constricted portions of the outer member and the key being held in the outer member by impingement of the shoulder portions of the key against the spherical surface of the inner member the improvement comprising the provision of a radial slot extending entirely through the walled key, a resilient member disposed in said slot and abutting the inner surface of each of the walls, adjusting means in the wall of the key to vary the width of the slot thereby varying the bearing tolerance between the inner and outer member and varying the degree of compression of said resilient member and therefore the degree of the preloading force exerted by the key member on the spherical surface of the inner member.

2. A spherical bearing assembly in accordance with claim 1 wherein the said resilient member is at least one resilient O-ring disposed in said slot.

3. A spherical bearing assembly in accordance with claim 2 wherein there is one resilient O-ring disposed centrally about the adjusting means, said adjusting means being a threaded screw threaded into one of said walls of said key.

4. A spherical bearing assembly in accordance with claim 3 wherein there is provided a matching annular groove in each face of the walls of said key, said O-ring positionally disposed within said matching annular grooves.

5. A spherical bearing assembly in accordance with claim 1 wherein said resilient member is a sheet of resilient material disposed in said slot.

6. A spherical bearing assembly in accordance with claim 5 wherein said sheet material is homogenous in nature.

7. A spherical bearing assembly in accordance with claim 5 wherein said material is a laminated structure.

8. A spherical bearing assembly in accordance with claim 5 wherein said sheet material completely fills the slot in said key.

* * * * *